(12) United States Patent
Alexander

(10) Patent No.: US 8,468,618 B2
(45) Date of Patent: Jun. 25, 2013

(54) SINK INSERT

(76) Inventor: Ian Maxwell Alexander, Aitkenvale (AU)

(*) Notice: Subject to any disclaimer, the term of this patent is extended or adjusted under 35 U.S.C. 154(b) by 777 days.

(21) Appl. No.: 12/449,852

(22) PCT Filed: Feb. 28, 2008

(86) PCT No.: PCT/AU2008/000259
§ 371 (c)(1),
(2), (4) Date: Feb. 26, 2010

(87) PCT Pub. No.: WO2008/104027
PCT Pub. Date: Sep. 4, 2008

(65) Prior Publication Data
US 2010/0192294 A1 Aug. 5, 2010

(30) Foreign Application Priority Data
Mar. 1, 2007 (AU) ................................ 2007200891

(51) Int. Cl.
*E03C 1/244* (2006.01)
(52) U.S. Cl.
USPC ........................... 4/654; 4/619; 4/651
(58) Field of Classification Search
USPC .............. 4/654, 655, 650, 657, DIG. 18, 619, 4/660, 694, 651
See application file for complete search history.

(56) References Cited

U.S. PATENT DOCUMENTS

| | | | |
|---|---|---|---|
| 758,770 A * | 5/1904 | McCann | 4/655 |
| 834,983 A | 11/1906 | James | |
| 912,086 A | 2/1909 | De Lory | |
| 1,107,862 A | 8/1914 | Stubbs | |
| 1,987,020 A * | 1/1935 | Looft | 4/655 |
| 2,496,684 A * | 2/1950 | Upchurch | 4/654 |
| 4,336,620 A | 6/1982 | Gresh | |
| 5,136,736 A * | 8/1992 | Bishop | 4/641 |
| D337,379 S * | 7/1993 | Mele | D23/293.1 |
| 5,661,857 A * | 9/1997 | McLean | 4/657 |
| 7,992,235 B2 * | 8/2011 | Booth | 4/656 |
| 8,117,689 B2 * | 2/2012 | Slayton | 4/630 |

FOREIGN PATENT DOCUMENTS

| | | |
|---|---|---|
| JP | 2000229680 | 8/2000 |
| JP | 2005342417 | 12/2005 |
| JP | 2005342417 A * | 12/2005 |

OTHER PUBLICATIONS www.ortleibusa.com portable sink Mar. 14, 2006.*
English machine translation of JP2005342417A.*
English abstract of JP2005342417A.*

* cited by examiner

*Primary Examiner* — Gregory Huson
*Assistant Examiner* — Christine Skubinna
(74) *Attorney, Agent, or Firm* — Stein IP, LLC

(57) ABSTRACT

A device that can be inserted into a sink to collect water for reuse, the device comprising a water tight body portion adapted to hold water, a drain opening to enable water to be drained from the device, closure means to enable the drain to be closed when not required, and means to hold the device generally within the sink.

11 Claims, 4 Drawing Sheets

SINK INSERT

FIELD OF THE INVENTION

This invention is directed to an insert having a particular design which enables it to be inserted into a sink bowl to collect water for recycling or reuse. The invention will be described with reference to a sink insert but it should be appreciated that an identical or similar device may be used with articles other than sinks and this may include small bath tubs, laundry tubs and the like.

BACKGROUND ART

In Australia there is presently a severe drought and many cities are facing severe water shortages. This results in the imposition of various restrictions including a prohibition on garden watering.

For this reason, reuse of "grey" water is being strongly promoted. Greywater comprises water from a shower, a sink, a bath tub, a laundry etc that is not potable but is still clean enough for garden use. This is in contrast to "black" water which includes sewage and is unsuitable for garden use.

One source of greywater that can be reused is sink water. It is envisaged that many liters of water could be collected and reused as greywater from the sink.

It is known to modify the plumbing from the sink to the sewerage/septic to provide a diverter valve that can be turned to divert the water from the sewerage/septic to the garden. A hose is normally attached to the diverter valve such that water can be diverted through the hose and into a garden bed etc. A disadvantage with this arrangement is the expense in installing a diverter valve. Another disadvantage is that it is sometimes not possible to install a diverter valve. For instance, many units, townhouses and the like do not allow installation of a diverter valve. Also, the valve can only divert water to "downstream" areas and is therefore not particularly suitable for watering hanging pots etc.

It is known to provide a bowl or bucket in the sink to collect greywater for reuse. However, these are not very satisfactory because the bowl or bucket is usually rounded while the sink is usually somewhat rectangular which means that much of the sink volume cannot be used. As most buckets will hold 9 L of water, the size of the bucket is such that it can not be properly used in a sink because it will strike the spout or taps, or the spout/tap has a design which does not allow water to flow from the spout into the bucket unless the bucket is tipped to one side which defeats the purpose. For this reason, bowls are much more popular but when the bowl is full, it is quite difficult to hold the bowl (this usually requires two hands) and to carefully walk through the kitchen and through the door to empty the bowl into the garden. It is not uncommon to spill the greywater. If the bowl is large, the weight can be quite considerable especially for older people.

Most bowls will usually only hold about 4 L which requires the bowl to be emptied several times.

Another problem with the use of bowls or buckets in the sink is that it is difficult to release unwanted water down the plug hole of the sink. It is necessary to lift and tip the bucket which can be quite heavy.

It will be clearly understood that, if a prior art publication is referred to herein, this reference does not constitute an admission that the publication forms part of the common general knowledge in the art in Australia or in any other country.

OBJECT OF THE INVENTION

It is an object of the invention to provide a device that can be placed in a sink, laundry tub etc, to collect greywater and which may overcome at least some of the above-mentioned disadvantages or provide a useful or commercial choice in the marketplace.

In one form the invention resides in a device that can be inserted into a sink to collect water for reuse, the device comprising a water tight body portion adapted to hold water, a drain opening to enable water to be drained from the device, closure means to enable the drain to be closed when not required, and means to hold the device generally within the sink.

In this manner, the device can be seen as a "sink insert" that can be placed in the sink and, when in place, the sink can be used in an ordinary manner. The device has a drain opening or something similar such that any unwanted liquid or solids in the can be drained through the existing sink/laundry tub outlet.

It is envisaged that the device will be shaped to substantially fill the sink bowl (e.g. almost a "second skin") such that the device, when in place, will not be in the way and will not make it difficult to use the sink in an ordinary manner.

Various advantages are envisaged. For instance, it is possible to take the device to a water tank or a separate supply of water and to fill the device with water and then to place the device in a sink bowl to enable dishes to be washed etc without requiring town water. This is in contrast to the alternative where a bucket needs to be filled and poured into the sink which can result in waste and spillage and often a certain amount of guesswork is required to determine exactly how much water is required.

The device can be placed in the sink bowl and town water can be used e.g. to wash vegetables, clean dishes etc, and afterwards, a decision can be made to reuse the water. If the water is not required for reuse, the water can be simply drained from the device and through the existing drain hole in the sink. If the water is required, the device can be lifted out the sink and taken to wherever the water is required.

Another advantage is that when the device is taken outside (e.g. to a garden bed), it can either be tipped to empty the water, or the drain opening in the device can be opened to allow water to flow into the garden bed without requiring a two-handed tipping action. This may make it easier for use with elderly people.

The saved water can be used for any number of suitable purposes including garden use, washing cars, washing pets, toilet flushing, floor washing, window cleaning, cleaning of driveways, washing and cleaning furniture and tools, and the like.

It is preferred that the device has a general shape and configuration to allow it to be inserted into a sink bowl and to substantially fill the sink bowl. As most sink bowls are generally rectangular when viewed in plan, it is envisaged that the device will also be substantially rectangular. However, if the sink bowl is circular, the device may also be substantially circular etc.

The device has a water tight body portion and this part of the device preferably sits substantially within the confines of the sink bowl. It is preferred that the water tight body portion of the device does not project in an awkward manner above the top of the sink bowl as this may present a striking hazard, and may make it difficult for the spout to function properly without striking. It is envisaged that the water tight body portion is entirely open at the top and the top edge of the portion sits substantially at the same height as the top of the sink bowl. It is however envisaged that the top edge may sit slightly below the top of the sink bowl or even slightly above providing that it does not become awkward to use.

It is preferred that the device has some type of overflow mechanism such that if the water tight body portion is over filled, excess water will flow into the sink bowl and not onto the floor. One way in which this can be achieved is to have some part of the water tight body portion positioned below the top of the sink bowl or spaced inwardly from the edge of the sink bowl such that water overflowing this part of the water tight body portion will simply flow into the sink bowl.

Thus, the water tight body portion may have an upper lip or peripheral edge which is spaced inwardly from the peripheral edge of the sink bowl to provide a small overflow gap which means that water overflowing the water tight body portion will flow through the small gap and into the sink bowl and not onto the floor.

The water tight body portion may have any suitable shape and size. To enable the device to be lifted out of the sink, it is envisaged that the volume of the water tight body portion should be such that between 4-20 L of water can be collected and preferably about 8-10 L. As a normal plastic bucket typically holds about 9-10 L, it is envisaged that the water tight body portion should be something similar such that the weight of the device when filled with water is about the same as a bucket full of water.

A drain opening is provided to enable water to be drained from the device without needing to lift and tip the device over to empty the water. The drain opening will preferably be provided in a lower portion of the device and preferably in the bottom wall of the water tight body portion. The drain opening may be of a similar shape and size to the normal drain opening in a sink. The drain opening can be plugged by a conventional rubber or plastic sink plug. Another advantage with having the drain opening being similar to the drain opening in the sink is that a conventional sieve or something similar can be placed into the drain opening of the device. Thus, specially designed plugs etc are not required.

There may be circumstances where the drain opening may be provided in a side wall or somewhere else. There may be circumstances where more than one drain opening is provided. There may be circumstances where the drain opening is not "conventional" and may comprise a slot, or some other shape and configuration.

The closure means to close the drain opening will typically comprise a sink plug or something else which is well-known and conventional. However, it is also envisaged that the closure means may comprise a stopper. There may be circumstances where the closure means may comprise some form of valve which can be operated between an open or closed position. The valve may comprise a slide valve, a turn valve or something else.

Some form of means is provided to hold the device generally within the sink. In a simple form, the shape of the device may be sufficient to enable it to be placed into and supported by the sink walls. However, it is also envisaged that some form of support rail or flange or projection or member or other means may be provided which extends over part of the sink adjacent the bowl such that the device is somewhat suspended in the sink bowl by the support rail etc. As an example, the means may provide a support member extending outwardly from the remainder of the device (and, in a more specific example, extending outwardly from the top of the water tight body portion) and which can be supported by the relatively flat part of the sink immediately about the bowl. The device can have a combined rim and support member formed integrally and supporting the weight of the device in the sink and slightly above the sink bottom. The support member may comprise finger members and the like which can extend from the remainder of the device and over the edge of the sink to hold the device in the sink. These finger members may be pivoted between extended use positions and retracted non use positions and may be length adjustable.

An advantage of this arrangement is that the device may be suitable for sink bowls which have slightly different shapes. Another advantage of this arrangement is that it may be easier to lift the device out of the sink bowl as the device will not rub or "stick" against the wall of the sink bowl.

It is desirable for some type of lifting means to be provided to assist in lifting and lowering the device out of, and into the sink bowl. In a simple form, the lifting means may comprise at least one handle and it is preferred that a pair of handles is provided. The handles are preferably movable between a raised "use" position and a lowered "non use" position such that the handles do not become an obstacle when the device is in the sink. It is also envisaged that the lifting means may comprise some form of hand grip portion or portions.

It is desirable for a lower part of the device to be provided with some form of "anti-stick" or "anti-suction" means to prevent the device from sticking to the bottom wall of the sink bowl. In a simple manner, this can be achieved by providing one or more small projections (such as ribs, legs, bumps, etc) on the bottom wall of the device to slightly space the bottom wall above the bottom wall of the sink and to provide a small air gap to prevent suction and also to allow water to drain through the sink bowl outlet. This spacing need not be large and it is envisaged that the spacing will be between 1-10 mm and typically between 3-6 mm. These projections can also function to support the device, especially when full of water.

The device can be made from any suitable material. It is envisaged that the device will be made from plastic and typically from polyethylene or polyvinylchloride although it is not envisaged that any particular limitation should be placed on the invention merely by illustrating these particular suitable materials. Alternatively, the device can be made from metal, composite materials, laminate materials, rubbers and the like. It is envisaged that the device may be formed from a combination of materials such as a metal watertight body portion and a plastics surround, or a plastic watertight body portion and a metal surround or any other combination.

It is envisaged that the device will be substantially rigid (for instance like a plastic bucket) although there may be circumstances where parts of the device may be more flexible. For instance, the water tight body portion may comprise a flexible bag and the surround may be made of rigid material. Alternatively a flexible sidewall and a more rigid bottom wall may be provided. However, to enable a drain opening to be provided, it is envisaged that the entire device will be made of relatively rigid plastics material similar to that of a plastic bucket or plastic container.

The device can be suspended over/into a laundry tub to catch laundry water for reuse.

BRIEF DESCRIPTION OF THE DRAWINGS

An embodiment of the invention will be described with reference to the following drawings in which.

BEST MODE

Figure 1:
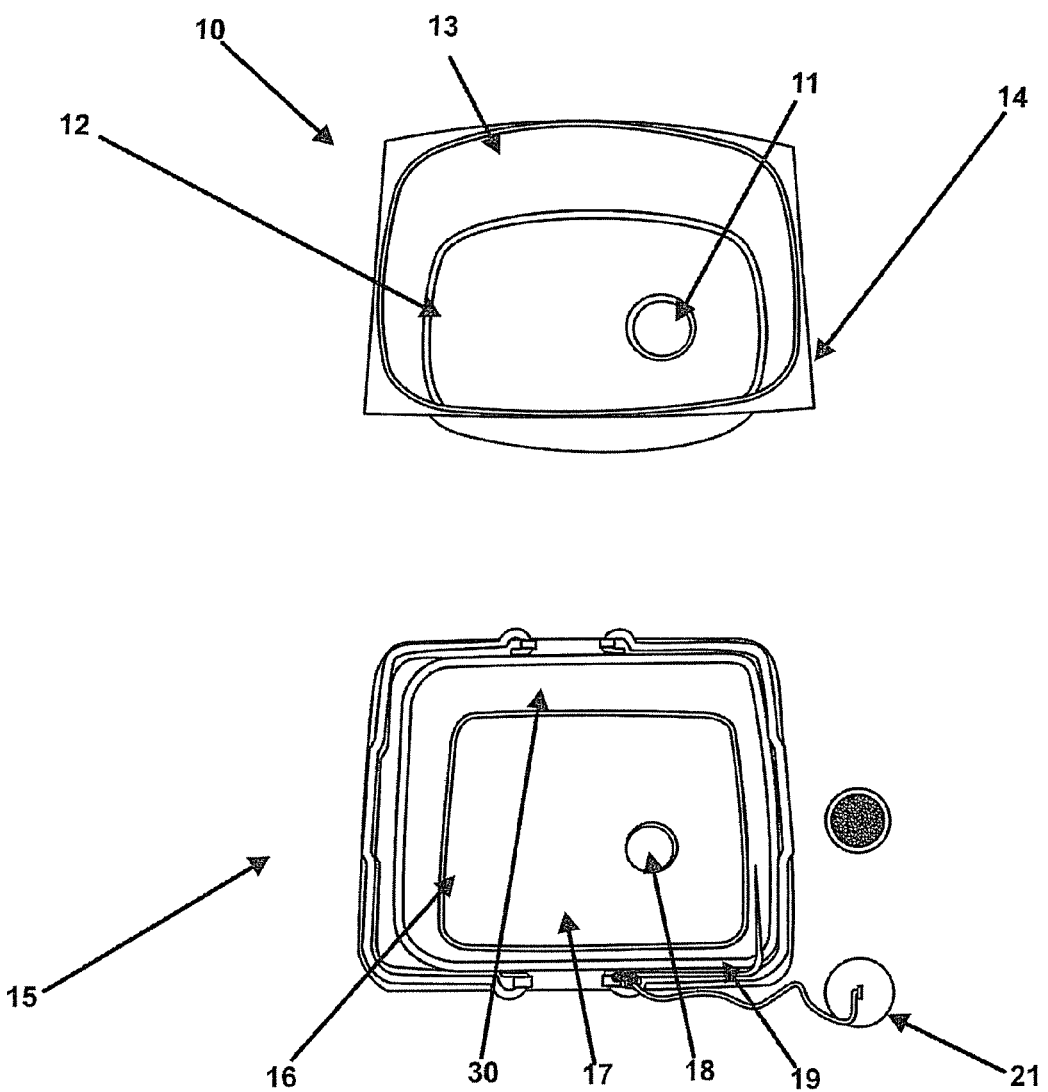
FIG. 1. Illustrates a conventional steel sink bowl and, next to the sink bowl, the device that can be inserted into the sink bowl.

Referring to the illustrations, and initially to FIG. 1, there is illustrated part of a conventional steel sink comprising a sink bowl 10 having a bottom outlet 11, this being entirely conventional. The sink bowl 10 has a bottom wall 12, a side wall 13, and outwardly extending substantially horizontal top wall 14.

The device according to an embodiment of the invention is illustrated generally as reference numeral 15 and is adapted to be positioned within the sink bowl 10. Device 15 comprises a water tight body portion 16 which has a shaped similar to that of the sink bowl and therefore also comprises a bottom wall 17, and a side wall 30 which terminates in an upper rim 19 (rim 19 being best illustrated in FIG. 2 at least).

A drain opening 18 is provided in the bottom wall 17 of the device and is shaped to the identical or similar to outlet 11 in the steel sink bowl. Consequently, a conventional sieve 20 (see FIG. 2) or a conventional plug 21 (see FIG. 1) can be used in drain opening 18.

Also, in the particular embodiment, the positioning of drain opening 18 is such that it is in some alignment with the drain opening 11 of the steel sink bowl 10 which means that water flowing through drain opening 18 will quickly flow through drain opening 11.

A closure means is provided to enable drain opening 18 to be closed, and in the particular embodiment, the closure means comprises plug 21.

Figure 4:
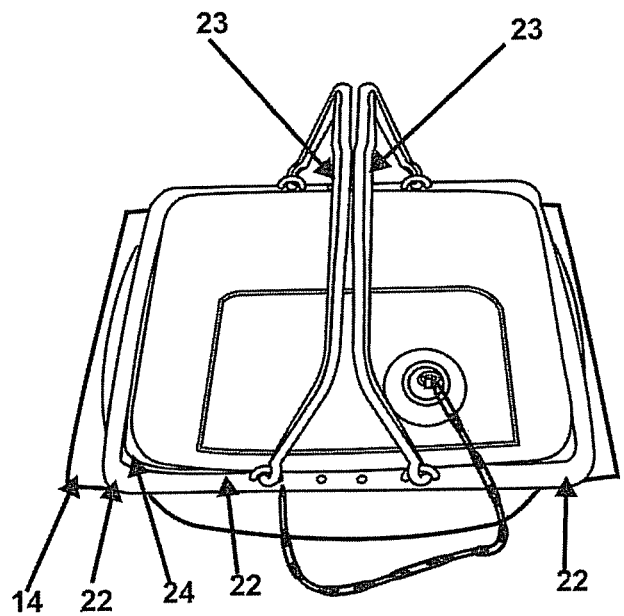
FIG. 4. Illustrates the device of FIG. 3 but now with the lifting handles in the upright lifting position which means that the device can be lifted out of the sink.
Figure 5:
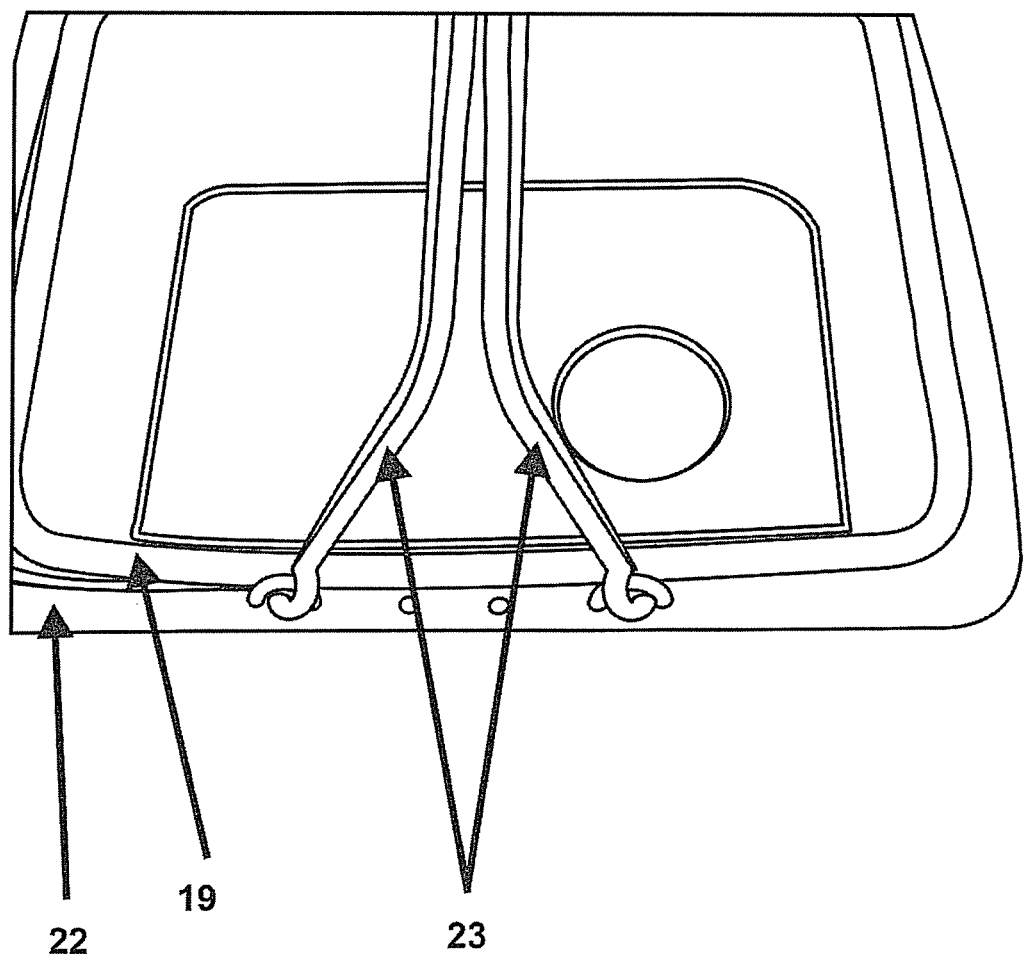
FIG. 5. Illustrates in greater detail attachment of the handles to the remainder of the device.

Referring to FIG. 4, and FIG. 5, there is best illustrated a means to hold the device generally within the sink.

In the particular embodiment, the means comprises an outwardly extending relatively rigid peripheral rib or support rail 22 which is attached to the bowl portion 16 of the device and which is designed to extend over the horizontal portion 14 (see FIGS. 2-4) of the sink such that the body portion 16 is somewhat suspended in the steel sink bowl 10. This arrangement may make it easier to lift or lower the device into the sink bowl 10.

Lifting means which, in the particular embodiment, comprises a pair of lifting handles 23 is provided. Handles 23 can pivot between a "non use" position (see at least FIG. 2 and FIG. 3) and a raised "use" position (see at least FIG. 4).

Figure 2:
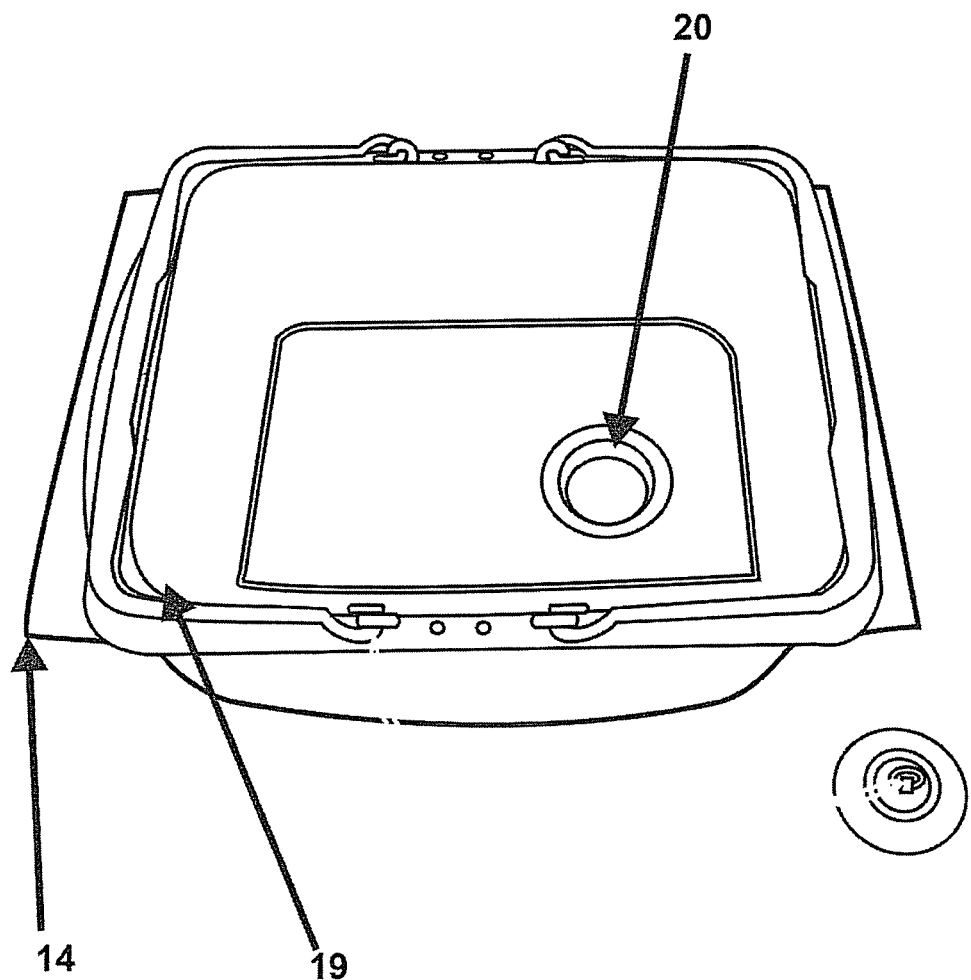
FIG. 2. Illustrates the device of FIG. 1 inserted into the sink bowl and with the lifting handles in the folded position and the drain opening containing a conventional sieve.
Figure 3:
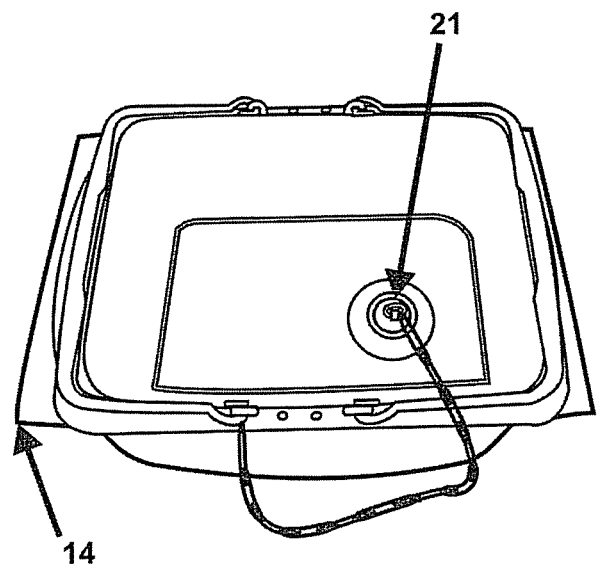
FIG. 3. Illustrates the device of FIG. 2 with the conventional sieve removed and a plug inserted into the drain opening.

When not required, the handles can be pivoted down to sit on top of rib or support rail 22, this being best illustrated in FIG. 2 and FIG. 3. The attachment of the handles to the remainder of the device is illustrated in FIG. 5, but it should be appreciated that no particular limitation should be placed on the invention merely by this particular attachment means.

The shape and size of portion 16 relative to the steel sink bowl 10 and relative to the surrounding supporting wall 14 is such that a small overflow gap 24 (see for instance FIG. 4) is provided. Thus, if the bowl portion 16 is over filled, water will overflow into gap 24 and down through outlet 11 of the steel sink.

Small legs or lifts (not illustrated) may be provided underneath the bottom wall 17 of body portion 16 to prevent suction in the sink and to allow draining of water if necessary.

The device can easily fit into existing domestic or similar sinks (or other similar devices). The device can collect water whenever the tap is turned on preventing water loss. The device can hold up to 10 L of water and can be removed with ease and the water can then be reused for any suitable purposes including garden watering, cleaning and the like.

When containing water, the device can be removed from the sink bowl and taken outside and emptied. The device can be emptied by tipping the device or by simply pulling the chain to remove plug 21 thereby enabling water to flow through the outlet.

When used for cleaning cars etc, the device can be taken outside with the plug remaining in place and the device can be used as a conventional bucket for washing.

As mentioned previously, it is also possible to fill the device from a water tank and then to place the device in the steel sink to clean dishes etc without using tap water.

In laundry use, the device can be placed in the laundry tub, and the washing machine outlet hose can be placed into the device to catch the washing machine water. If the water is not suitable, the plug 21 can be removed to allow the water to drain into the laundry tub for disposal. Any overflow water will spill over the rim 19 of the device and into the laundry tub.

The device can be made of any durable lightweight material which makes a portable and very easy-to-use. The device is inexpensive, can fit most sinks, basins, tubs etc, can be rigid or flexible, can be made from plastic, stainless steel or other material, can be used in domestic or industry applications, is portable, light, sturdy, durable, can be made in numerous colours, it is easy to remove from the sink etc, is easy to handle, easy to use, easy to clean, easy to empty, has fold away handles, can regulate water release, has a built-in overflow, is child safe, can be used by elderly people, does not require plumbing, has no installation costs, will not rust, will not damage the existing sink, and if water is not required, plug 21 can be removed and the water can simply flow through the existing sink outlet to septic/sewerage.

Throughout the specification and the claims (if present), unless the context requires otherwise, the term "comprise", or variations such as "comprises" or "comprising", will be understood to apply the inclusion of the stated integer or group of integers but not the exclusion of any other integer or group of integers.

Throughout the specification and claims (if present), unless the context requires otherwise, the term "substantially" or "about" will be understood to not be limited to the value for the range qualified by the terms.

Any embodiment of the invention is meant to be illustrative only and is not meant to be limiting to the invention. Therefore, it should be appreciated that various other changes and modifications can be made to any embodiment described without departing from the spirit and scope of the invention.

What is claimed is:

1. A device that can be inserted into a sink bowl to collect water for reuse, the device comprising a water tight body portion adapted to hold water, wherein the body portion has a peripheral rim and an outwardly extending support rail which, in use, is supported by the sink bowl so as to hold the device generally within the sink bowl and to ensure that the peripheral rim, when the device is inserted into the sink bowl, the rim being at the level of the top of the sink bowl, at least a portion of the rim of the body portion being spaced inwardly from the outwardly extending support rail to define an overflow gap between the rim and the support rail, the device further comprising a drain opening to enable water to be drained from the device, and a closure to enable the drain to be closed when not required.

2. The device as claimed in claim 1, wherein the water tight body portion has a shape and size to substantially fill the volume of the sink bowl.

3. The device as claimed in claim 1, wherein the drain opening extends through a bottom wall of the body portion.

4. The device of claim 3, wherein the position of the opening is such that, when the device is in the sink, the opening is close to the outlet in the sink bowl.

5. The device as claimed in claim 1, wherein the closure is a sink plug.

6. The device as claimed in claim 1, wherein the body portion is open topped and has a peripheral rim which is approximately at the level of the top of the sink bowl.

7. The device of claim 6, wherein the rim is spaced inwardly from the sink bowl to define an overflow gap.

8. The device as claimed in claim 1, further comprising a lift handle to allow the device to be lifted out of or into the sink.

9. The device of claim 8, comprising a pair of lift handles.

10. The device of claim 8, wherein the lift handle is pivotly mounted to move between a retracted nonuse position and an extended use position.

11. The device of claim 10, wherein the handle is on or adjacent the support rail when the handle is in the retracted position.

\* \* \* \* \*